US007146612B2

(12) United States Patent  
Sedlack

(10) Patent No.: US 7,146,612 B2  
(45) Date of Patent: *Dec. 5, 2006

(54) METHOD AND SYSTEM FOR RECEIVING A SOFTWARE IMAGE FROM A CUSTOMER FOR INSTALLATION INTO A COMPUTER SYSTEM

(75) Inventor: Derek J. Sedlack, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 629 days.

This patent is subject to a terminal disclaimer.

(21) Appl. No.: 09/860,804

(22) Filed: May 18, 2001

(65) Prior Publication Data

US 2004/0025154 A1    Feb. 5, 2004

(51) Int. Cl.
*G06F 9/445* (2006.01)
(52) U.S. Cl. .................................. 717/178; 717/175
(58) Field of Classification Search ........ 717/168–178; 714/30; 719/319; 713/2, 182, 1; 709/203
See application file for complete search history.

(56) References Cited

U.S. PATENT DOCUMENTS

| 5,523,854 | A | * | 6/1996 | Hornsby | 358/407 |
| 5,701,491 | A | * | 12/1997 | Dunn et al. | 717/167 |
| 5,732,268 | A | * | 3/1998 | Bizzarri | 713/2 |
| 5,787,491 | A | * | 7/1998 | Merkin et al. | 711/173 |
| 5,991,543 | A | | 11/1999 | Amberg et al. | 395/712 |
| 5,995,757 | A | | 11/1999 | Amberg et al. | 395/712 |
| 6,038,597 | A | | 3/2000 | Van Wyngarden | 709/219 |
| 6,052,720 | A | * | 4/2000 | Traversat et al. | 709/220 |
| 6,117,187 | A | * | 9/2000 | Staelin | 717/169 |
| 6,167,383 | A | | 12/2000 | Henson | 705/26 |
| 6,182,734 | B1 | * | 2/2001 | Ebert et al. | 156/581 |
| 6,189,100 | B1 | * | 2/2001 | Barr et al. | 713/182 |
| 6,510,402 | B1 | * | 1/2003 | Logan et al. | 702/186 |
| 6,615,365 | B1 | * | 9/2003 | Jenevein et al. | 714/6 |
| 6,714,937 | B1 | * | 3/2004 | Eynon et al. | 707/102 |
| 6,718,373 | B1 | * | 4/2004 | Bearden et al. | 709/220 |
| 6,772,192 | B1 | * | 8/2004 | Fulton et al. | 709/203 |

OTHER PUBLICATIONS

Digital Networks, "Network Access Software Guide", Digital, Andover, MA, PN: IG-DNAS0-00, 2-2001.*
Dell Financial Service, "Press Releases", Round Rock, TX, pp. 1-3, Jun. 30, 1998.*

* cited by examiner

*Primary Examiner*—Ted T. Vo
(74) *Attorney, Agent, or Firm*—Haynes and Boone, LLP

(57) ABSTRACT

A computer system is manufactured by providing a communications network between a customer and a manufacturer, configuring a first computer system to communicate with a second computer system and including a first program and a second program in the second computer system. The customer accesses the first program providing a software image to the manufacturer using the second program. The first program provides the customer with an option to upload the software image. The first program obtains customer information, and using the option, the customer requests the manufacturer to upload the software image in an ordered computer system. In response, the second program is downloaded to cause a boot disk to be created. The second program includes a boot code and a third program. The boot code and the third program are stored on the boot disk, the boot code being configured to initiate the third program. The second program is removed from the first computer system.

8 Claims, 9 Drawing Sheets

METHOD AND SYSTEM FOR RECEIVING A SOFTWARE IMAGE FROM A CUSTOMER FOR INSTALLATION INTO A COMPUTER SYSTEM

BACKGROUND

The disclosures herein relate generally to computer systems and more particularly to a method and system for receiving a software image from a customer for installation into a computer system.

Customers of computer manufacturers often want software and other data on a computer system to be fully configured when they receive the system from the manufacturer. In particular, customers often want the software and data on their computer systems to be customized to the customers preferred configuration. The process of configuring software and data of a computer system may be time consuming and require significant work on the part of the customer, the manufacturer, or both. Significant resources may be spent to obtain the preferred configuration and to install it onto one or more computer systems built by the manufacturer.

It would be desirable for a computer manufacturer to be able to efficiently receive a software image from a customer. Accordingly, what is needed is a method and system for receiving a software image from a customer for installation into a computer system.

SUMMARY

One embodiment, accordingly, provides a method of manufacturing a computer system. The method includes receiving an order and a software image via a communications network, building the computer system according to the order, and installing the software image on the computer system.

A principal advantage of this embodiment is that it allows a computer manufacturer to install a software image onto a computer system. A customer may configure software and data to a desired state to create a desired software image. The computer manufacturer obtains the software image from the customer and installs the image onto a computer system ordered by the customer.

DETAILED DESCRIPTION

Figure 1:
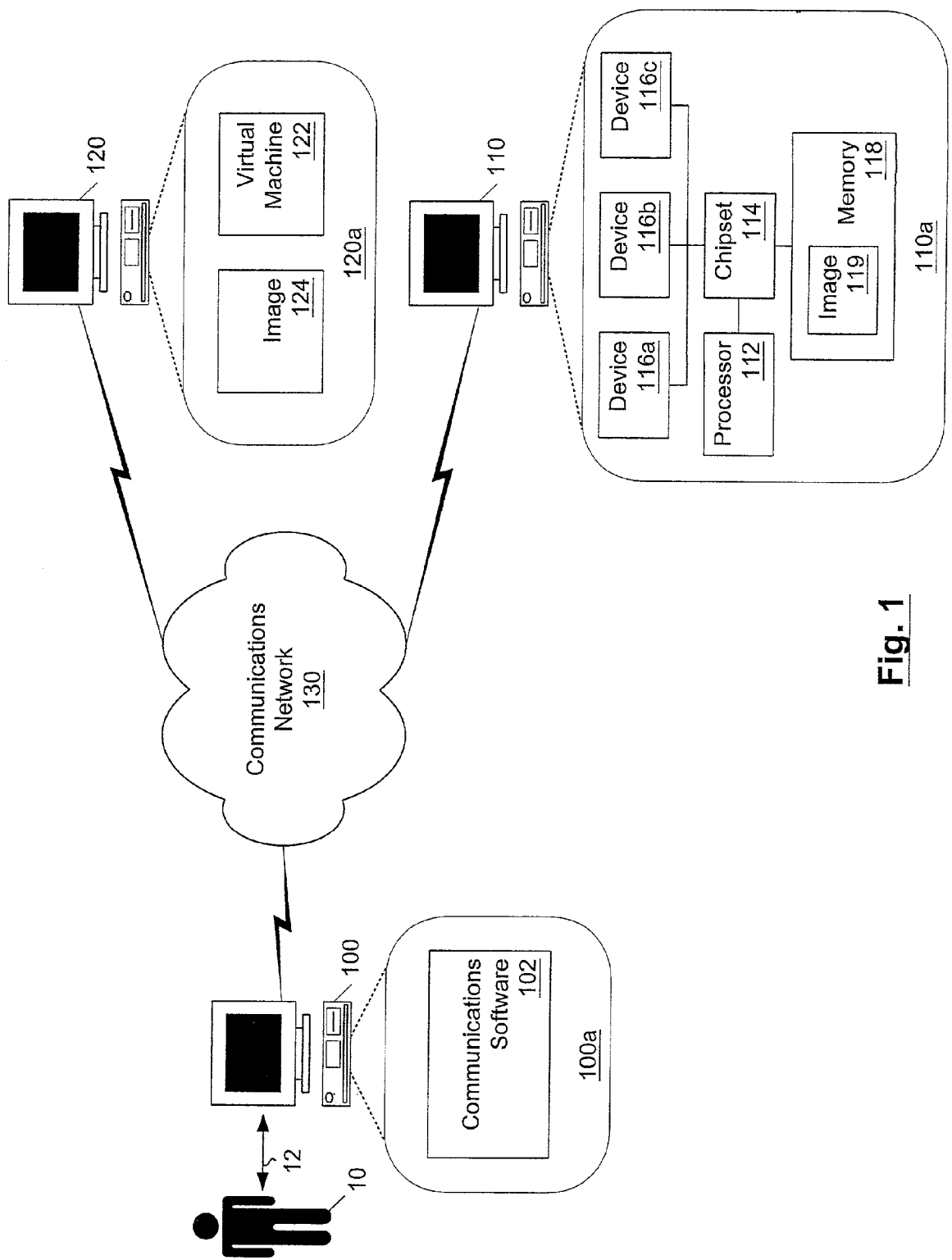
FIG. 1 is a diagram illustrating an embodiment of a first portion of a system for configuring a software image for installation into a computer system.

FIG. 1 is a diagram illustrating an embodiment of a first portion of a system for creating a software image for installation into a computer system. In FIG. 1, computer system 100 is configured to communicate with a computer system 110 and a computer system 120 using a communications network 130. Communications network 130 may be any suitable communications medium such as the Internet, an intranet, a point-to-point connection, or a wireless connection. Customer 10 operates computer system 100 as indicated by arrow 12.

As shown in box 100a, computer system 100 includes communications software 102. Communications software 102 allows customer 10 to communicate with computer system 110 and computer system 120. Communications software 102 may be a remote control tool such as Microsoft Terminal Services, LapLink, or PCAnywhere and may include a secure connection such as Virtual Private Networking. Communications software 102 may also be an internet browser such as Internet Explorer or Netscape Navigator. Computer system 100 may be any type of computer system that includes processing and storage capabilities. Examples of computer systems include desktop, laptop, server, portable, and handheld computer systems.

Computer systems 110 and 120 are configured to provide customer 10 with the ability to configure a software image for installation on one or more computer systems ordered from a computer manufacturer. Computer systems 110 and 120 simulate the operation of a computer system order by customer 10. As described in additional detail below, computer system 110 includes substantially identical components to the computer system ordered by customer 10. In contrast, computer system 120 includes a virtual machine program 122 configured to cause computer system 120 to simulate the operation of the computer system ordered by customer 10. Using computer system 100 and communications software 102, customer 10 accesses computer systems 110 or 120 to configure a software image that will be installed on one or more computer systems ordered by the customer. The operation of computer systems 110 and 120 will now be described separately.

In response to receiving an order from customer 10, a computer manufacturer may provide customer 10 with access to computer system 110. Computer system 110 is substantially identical to a computer system ordered by customer 10, i.e. computer system 110 includes the same or similar hardware and software components as the computer system ordered by customer 10.

As shown in a box 110a, computer system 110 includes a processor 112, a chipset 114, a plurality of devices 116a, 116b, and 116c, and a memory 118. Memory 118 includes a software image 119. Image 119 includes the software and data installed onto computer system 110. Processor 112, chipset 114, devices 116a, 116b, and 116c, and memory 118 are each components of computer system 110 and correspond to a hardware configuration selected by customer 10. Customer 10 may select each of the components individually or as part of a package or preexisting configuration of components offered by a computer manufacturer.

Customer 10 may also select the software and data components of software image 119. These components may include an operating system, hardware drivers, applications, and other data offered by the computer manufacturer. As with the hardware components, customer 10 may select each of the software and data components individually or as part of a package or preexisting configuration of components offered by the manufacturer.

The components shown in the embodiment of computer system 110 in FIG. 1 are shown by way of example. Other embodiments of computer systems may comprise other sets of components including components not shown in FIG. 1.

By providing customer 10 with access to computer system 110, customer 10 may configure the software and data on computer system 110 in a way that allows the computer manufacturer to replicate a preferred configuration of customer 10 onto one or more computer systems ordered by customer 10. In response to receiving an order from customer 10, the computer manufacturer may either build computer system 110 in accordance with the order or provide a previously built computer system 110 that meets the order. The process of building or providing computer system 110 may include installing or configuring hardware and software components according to the order.

After computer system 110 is ready, the computer manufacturer provides customer 10 with the ability to connect to computer system 110 from a remote location. In FIG. 1, customer 10 connects to computer system 110 using computer system 100 and communications network 130. The computer manufacturer may have customer 10 log in or select an indicator on a website to allow customer 10 to connect to computer system 110. After customer 10 is connected, customer 10 is provided with the ability to operate computer system 110 remotely. Customer 10 may configure computer system 110 in any manner desired. For example, customer 10 may change a configuration of an operating system, one or more applications, a file structure, a file system, a boot sequence, or one or more hardware drivers. Customer 10 may also create or store data on computer system 110 using an application on computer system 110 or by uploading the data from computer system 100.

Each change that customer 10 makes to the configuration of computer system 110 may be stored on computer system 110. In one embodiment, customer 10 is provided with a prompt to cause customer 10 to select whether customer 10 wishes the changes made by customer 10 to be saved. The prompt may occur automatically or in response to customer 10 selecting an indicator associated with a save function. Customer 10 may also be provided with an option to cancel any modifications to restore the configuration of computer system 110 to the original state. In other embodiments, changes made by customer 10 may be automatically saved.

After customer 10 finishes configuring the software and data in image 119, customer 10 provides an indication to the computer manufacturer that image 119 is complete. If image 119 is not complete, the state of image 119 may be saved by the computer manufacturer for a subsequent access or accesses by customer 10.

In one embodiment, customer 10 is prompted to indicate whether image 119 is complete in response to selecting whether to save modifications to image 119. In another embodiment, customer 10 selects an indicator that causes the computer manufacturer to be notified that image 119 is complete. In other embodiments, customer 10 may provide an indication to the computer manufacturer in other ways such as by sending an email or making a telephone call to the computer manufacturer.

As an alternative to providing customer 10 with access to an actual computer system substantially similar to the computer system ordered by customer 10, a computer manufacturer may provide customer 10 with access to a computer system that is configured to simulate the operation of the computer system ordered by customer 10. In FIG. 1, computer system 120 is configured to simulate the operation of the computer system ordered by customer 10.

As shown in a box 120*a,* computer system 120 includes a software image 124 and virtual machine 122. Image 124 includes the software and data to be installed onto one or more computer systems ordered by customer 10. Virtual machine 122 is a computer program configured to execute on computer system 120. Virtual machine 122 is configured to cause computer system 120 to simulate the operation the computer system ordered by customer 10. In response to receiving an order from customer 10, the computer manufacturer may build the computer system ordered by customer 10 using virtual machine 122 to create a virtual computer system. The computer manufacturer then provides customer 10 with access to the virtual computer system.

To simulate the operation of the computer system ordered by customer 10, virtual machine 122 is provided with information associated with the software and hardware components of the ordered system. Virtual machine 122 may detect this information from order information stored in a database or may be configured with this information by the computer manufacturer.

In particular, virtual machine 122 causes computer system 120 to simulate the appearance and operation of the software and data stored in image 124. Customer 10 accesses this simulation using computer system 100 and communications software 102 and may make modifications to the software and data stored in image 124 in a way similar to that discussed above for making modifications to the software and data in image 119 on computer system 110.

As with computer system 110 discussed above, each modification that customer 10 makes to the configuration of image 124 may be stored on computer system 120. In one embodiment, customer 10 is provided with a prompt to cause customer 10 to select whether customer 10 wishes the modifications made by customer 10 to be saved. The prompt may occur automatically or in response to customer 10 selecting an indicator associated with a save function. Customer 10 may also be provided with an option to cancel any modifications to restore the configuration of image 124 to the original state. In other embodiments, modifications made by customer 10 may be automatically saved.

After customer 10 finishes configuring the software and data in image 124, customer 10 provides an indication to the computer manufacturer that image 124 is complete. If image 124 is not complete, the state of image 124 may be saved by the computer manufacturer for a subsequent access or accesses by customer 10.

In one embodiment, customer 10 is prompted to indicate whether the image is complete in response to selecting whether to save modifications to the image. In another embodiment, customer 10 selects an indicator that causes the computer manufacturer to be notified that image 119 is complete. In other embodiments, customer 10 may provide an indication to the computer manufacturer in other ways such as by sending an email or making a telephone call to the computer manufacturer.

Figure 2:
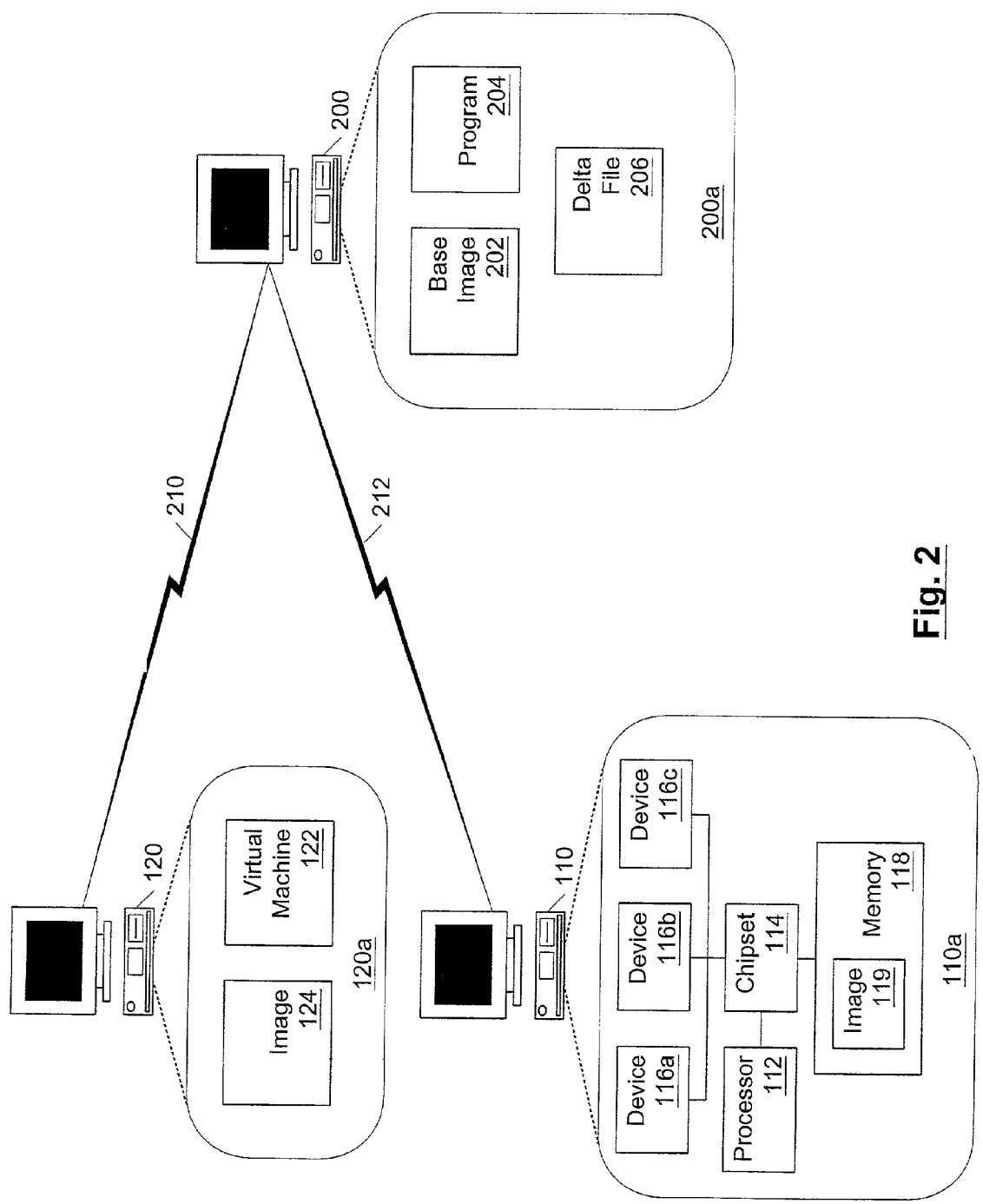
FIG. 2 is a first diagram illustrating an embodiment of a second portion of a system for configuring a software image for installation into a computer system.

FIG. 2 is a first diagram illustrating an embodiment of a second portion of a system for configuring a software image for installation into a computer system. In FIG. 2, a computer system 200 is configured to communicate with computer systems 110 and 120 from FIG. 1 as indicated by connection indicators 210 and 212, respectively. As shown by a box 200a, computer system 200 includes a base image 202, a program 204, and a delta file 206.

After customer 10 finishes modifying an image, computer system 200 accesses that image and provides the image to a manufacturing process for installation onto one or more computer systems ordered by customer 10. Where customer 10 accessed and modified image 119 on computer system 110, computer system 200 accesses image 119 on computer system 120 and provides image 119 to the manufacturing process. Similarly, where customer 10 accessed and modified image 124 on computer system 120, computer system 200 accesses image 124 on computer system 120 and provides image 124 to the manufacturing process.

Program 204 causes computer system 200 to access image 119 or 124 and provide the image to the manufacturing process. In the embodiment shown in FIG. 2, program 204 causes the image to be compared with base image 202. Base image 202 corresponds to the original state of the image. By comparing the image 119 or 124 to base image 202, program 204 causes computer system 200 to detect the differences between this preferred image of customer 10 and base image 202 and store these differences in delta file 206. Accordingly, computer system 200 may provide the preferred image of customer 10 to the manufacturing process by providing delta file 206 and base image 202 instead of providing the entire image. Delta file 206 and base image 202 may be used in the manufacturing process to recreate the preferred image of customer 10. In other embodiments, image 119 or image 124 may be provided to the manufacturing process in other ways.

In the manufacturing process, image 119 or image 124 or a recreation of one of these images may be installed onto one or more computer systems ordered by customer 10.

Figure 3:
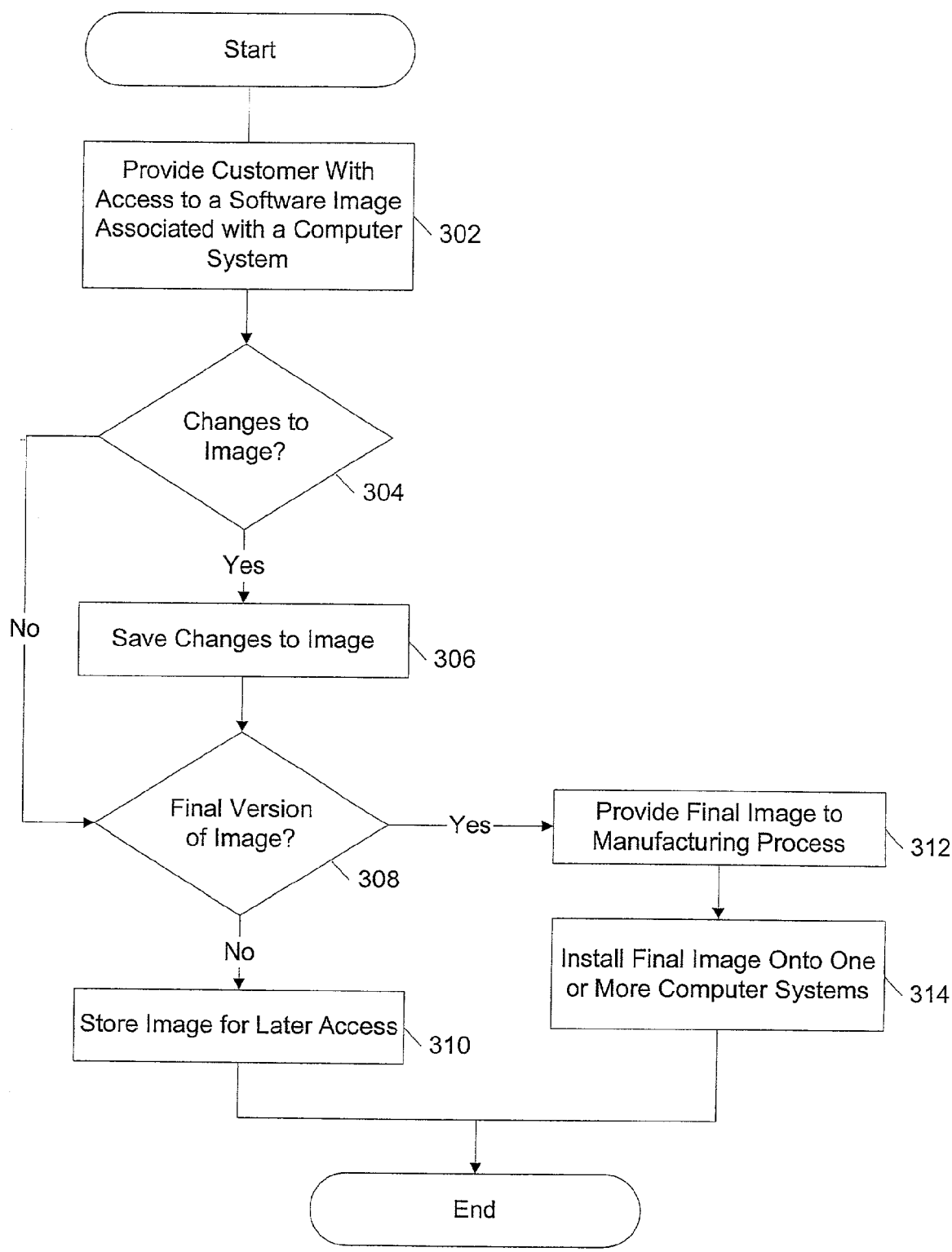
FIG. 3 is a flow chart illustrating an embodiment of a method for configuring a software image for installation into a computer system.

FIG. 3 is a flow chart illustrating an embodiment of a method for configuring a software image for installation into a computer system. A customer is provided with access to a software image associated with a computer system as indicated in step 302. A determination is made as to whether changes to the image have been made as indicated in step 304. If no changes have been made, the method continues at step 308. If changes have been made, then the changes are saved as indicated in step 306.

A determination is made as to whether the image is the final version of the image as indicated in step 308. If the image is not the final version, the image is stored for later access by the customer. If the image is the final version, then the final image is provided to the manufacturing process as indicated in step 312. The final image is installed onto one or more computer systems as indicated in step 314.

FIGS. 4a through 4d are diagrams illustrating an embodiment of a system for receiving a software image for installation into a computer system. In FIGS. 4a through 4d, computer system 100 is configured to communicate with a server 400 using communications network 130. Network 130 may be any suitable communications medium such as the internet, an intranet, a point-to-point connection, or a wireless connection. Customer 10 operates computer system 100 as indicated by arrow 12.

Figure 4A:
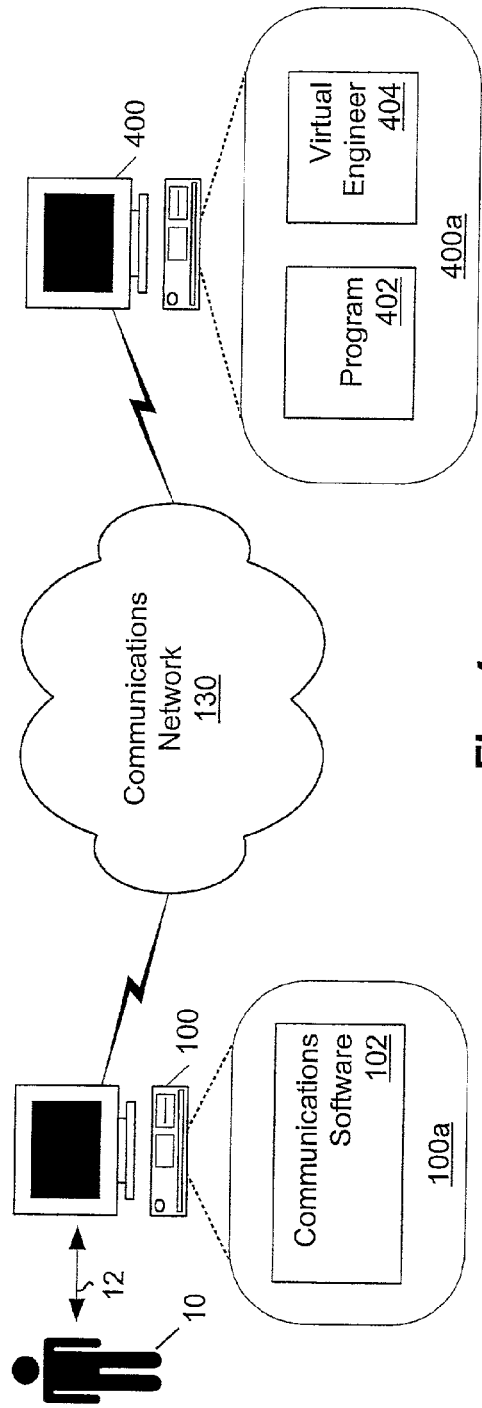
FIG. 4a is a first diagram illustrating an embodiment of a system for receiving a software image for installation into a computer system.

As shown in box 100a in FIG. 4a, computer system 100 includes communications software 102. Communications software 102 allows customer 10 to communicate with server 400. Computer system 100 may be any type of computer system that includes processing and storage capabilities. Examples of computer systems include desktop, laptop, server, portable, and handheld computer systems.

As shown in a box 400a in FIG. 4a, server 400 includes a program 402 and a virtual engineer program 404. Program 402 allows customer 10 to provide a computer manufacturer with a software image for installation into one or more computer systems using virtual engineer 404.

Customer 10 accesses program 402 using communications software 102 and communications network 130. Program 402 provides customer 10 with the ability to provide a software image to a computer manufacturer using virtual engineer 404. To provide a computer manufacturer with a software image to be installed onto a computer system, customer 10 configures software that may include an operating system, one or more applications, and data on computer system 100 to a desired state. This desired state forms a software image 152 (shown in FIG. 4c) that will be provided to the computer manufacturer.

After customer 10 performs this configuration, customer 10 logs onto server 400 using program 402. Program 402 may obtain customer information from customer 10 or may access previously stored customer information associated with customer 10. Program 402 may also obtain order information from customer 10 or may access previously stored order information associated with an order from customer 10 for one or more computer systems.

Figure 4B:
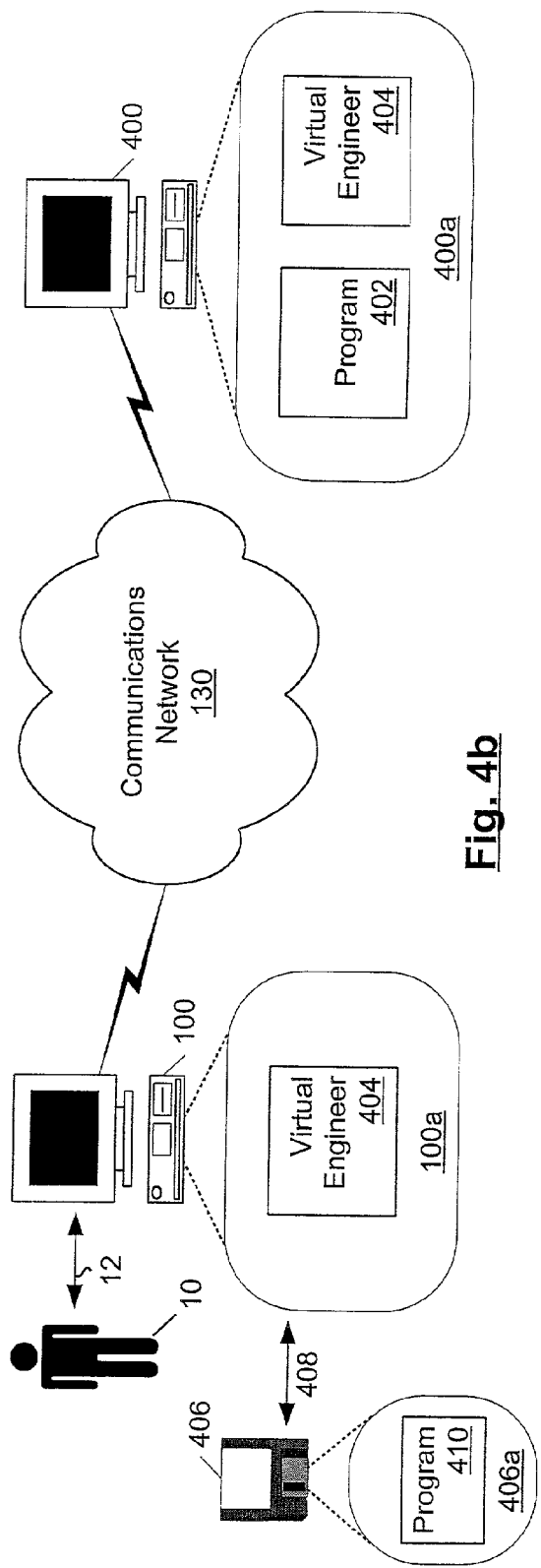
FIG. 4b is a second diagram illustrating an embodiment of a system for receiving a software image for installation into a computer system.

Program 402 provides customer 10 with the option to upload image 152. Using this option, customer 10 may provide a request to a computer manufacturer to upload image 152 for installation into a computer system ordered by customer 10. In one particular embodiment, customer 10 provides a request to upload image 152 by selecting an appropriate indicator on a website provided by the computer manufacturer using the internet. In response to the option being selected by customer 10, program 402 causes virtual engineer 404 to be downloaded to computer system 100 as shown in FIG. 4b. In other embodiments, virtual engineer 404 may be executed from a computer system remotely located from computer system 100.

In response to being downloaded onto computer system 100, virtual engineer 404 causes a boot disk 406 to be created as indicated by an arrow 408. Boot disk 406 may be a floppy disk, a CD-ROM, or other type of storage medium. Virtual engineer 404 includes a boot code (not shown) and a program 410. Virtual engineer 404 causes the boot code and program 410 to be stored onto boot disk 406 as indicated by a box 406a. The boot code includes instructions configured to boot computer system 100 independently of any boot code and/or operating system software stored on computer system 100. The boot code is configured to initiate program 410. In one embodiment, the boot code includes DOS drivers. In other embodiments, the boot code may include other type of drivers or programs.

Subsequent to creating boot disk 406, virtual engineer 404 is removed from computer system 100. In one embodiment, virtual engineer 404 causes a shortcut or link to a URL (uniform resource locator) to be stored onto computer system 100. The shortcut may cause program 402 on server 400 to be initiated. In an embodiment of computer system 100 configured to operate using a Windows operating system such as Windows 95, Windows 98, Windows NT, or Windows 2000, the shortcut may be stored as part of a startup folder, a registry run key or a registry run once key. In response to computer system rebooting using the boot code on boot disk 406, computer system 100 connects to server 400 according to the shortcut and causes program 402 to be initiated. In this embodiment, program 402 causes virtual engineer 404 to be removed from computer system 100.

Figure 4C:
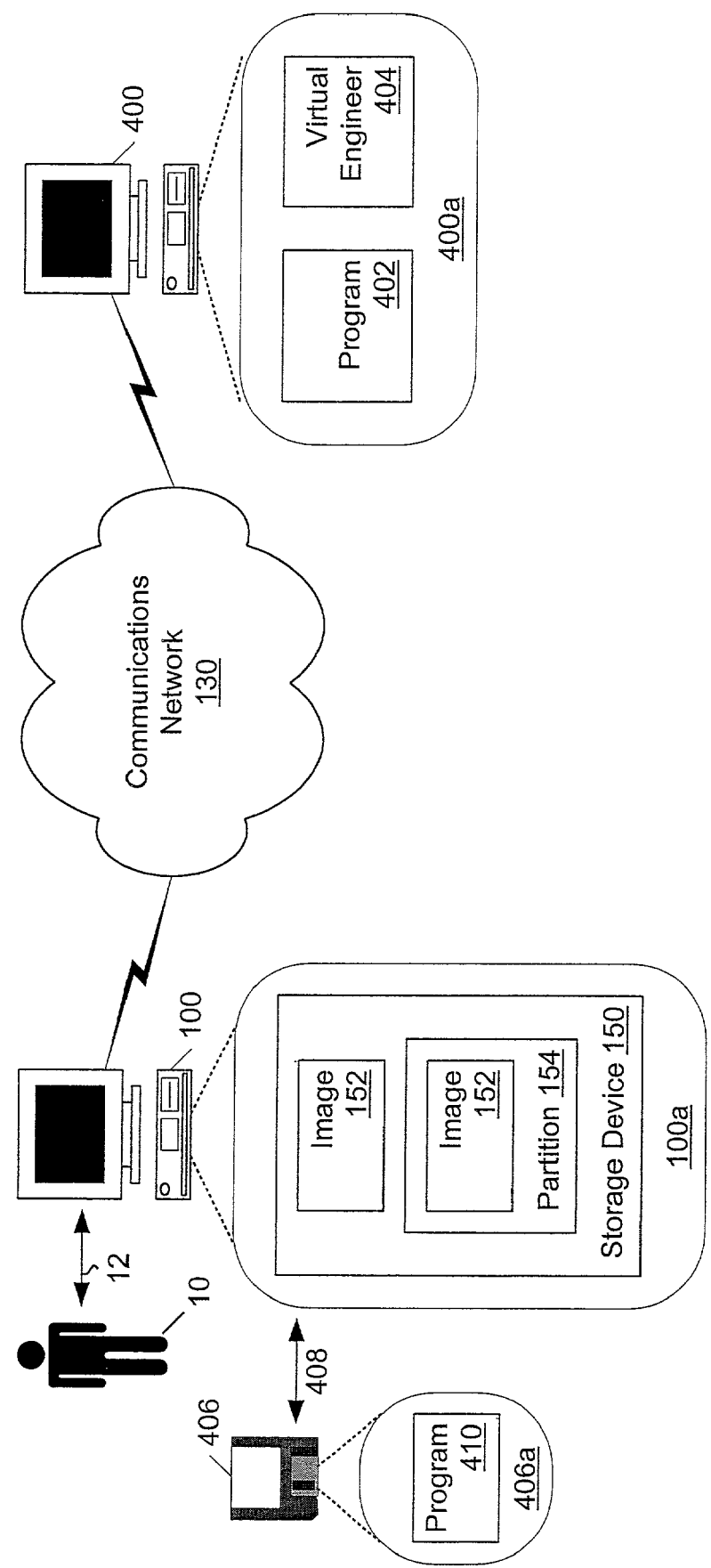
FIG. 4c is a third diagram illustrating an embodiment of a system for receiving a software image for installation into a computer system.

Referring now to FIG. 4*c*, program 410 includes instructions configured to cause image 152 to be uploaded to server 400. Image 152 is stored in computer system 100 on a storage device 150. Storage device 150 may be a hard disk drive or other memory configured to store software and/or data. Program 410 causes a new partition 154 to be created on storage device 150. Partition 154 includes memory space on storage device 150 that is not otherwise in use by computer system 100, i.e. free space. Program 410 then causes image 152 to be copied into the memory space included within partition 154 as indicated in FIG. 4*c*. In one embodiment, program 410 includes a version of PowerQuest Partition Magic, a version of PowerQuest Drive Image, and one or more scripts. In this embodiment, PowerQuest Partition Magic may be used to create partition 154 and PowerQuest Drive Image may be used to copy image 152 into partition 154. In other embodiments, other programs may be included in program 410 to perform the tasks of partitioning and copying.

Figure 4D:
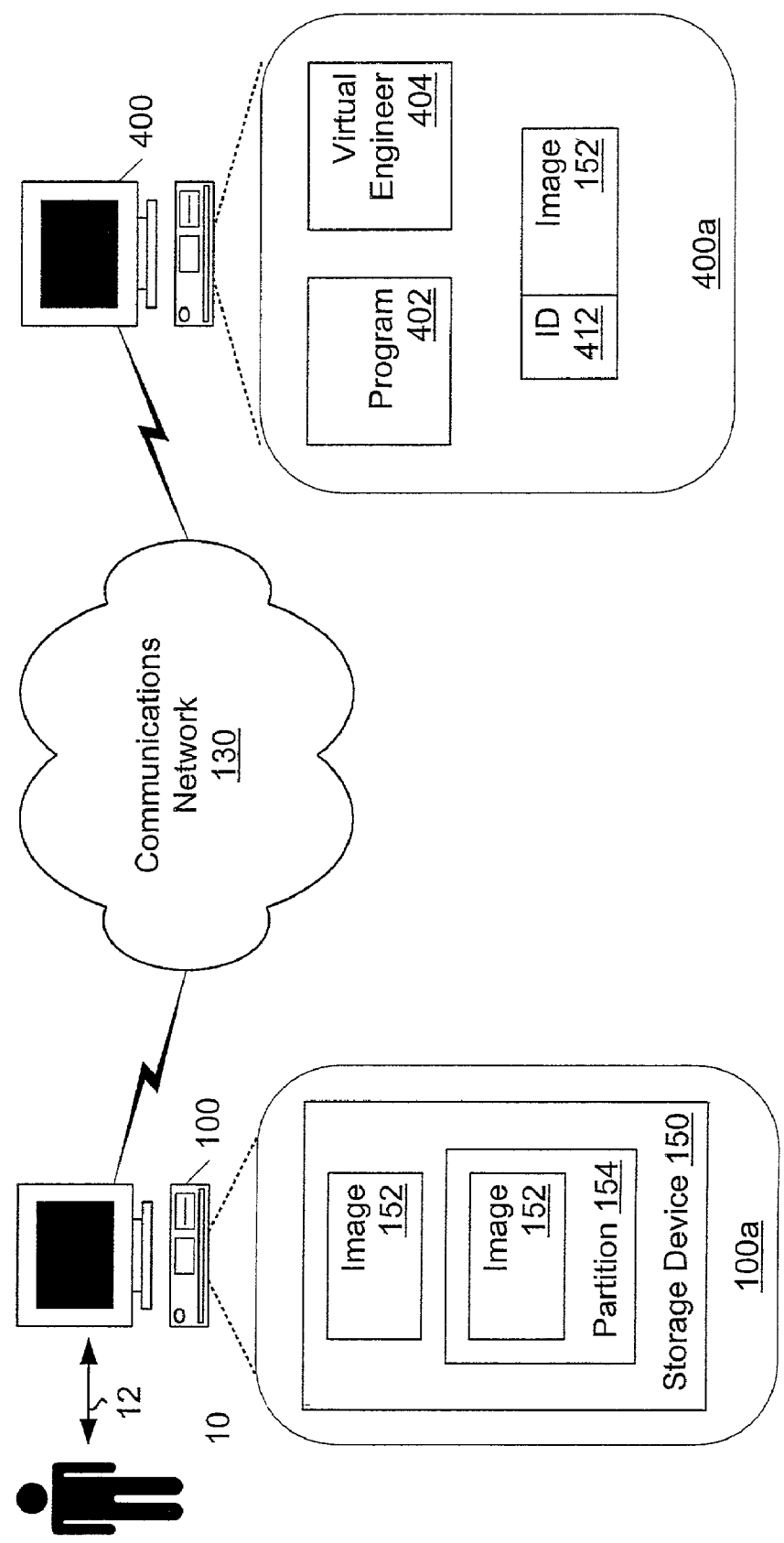
FIG. 4d is a fourth diagram illustrating an embodiment of a system for receiving a software image for installation into a computer system.

Referring now to FIG. 4*d*, computer system 100 is rebooted back to the operating system stored on computer system 100 after image 152 has been copied into partition 154. To prevent computer system 100 from booting using boot disk 406, the master boot record of the device used to boot computer system 100 with boot disk 406 may be disabled or customer 10 may remove boot disk 406 from the device. Computer system 100 then connects to server 400 according to a shortcut stored by virtual engineer 404 and causes program 402 to be initiated. Program 402 locates image 152 in partition 154 and causes image 152 to be uploaded onto server 400. Program 402 causes image 152 to be stored onto server 400 along with an identifier (ID) 412. ID 412 is an address that associates image 152 with customer 10 or an order associated with customer 10 and indicates where image 152 is located on server 400. ID 412 may be stored as part of the order information received from customer 10.

After image 152 is received by the computer manufacturer, image 152 is installed onto one or more computer systems ordered by customer 10. The computer systems may be built by the computer manufacturer according to an order from customer 10 and may include one or more components specified in the order. The computer systems may be build-to-order computer systems.

Figure 5:
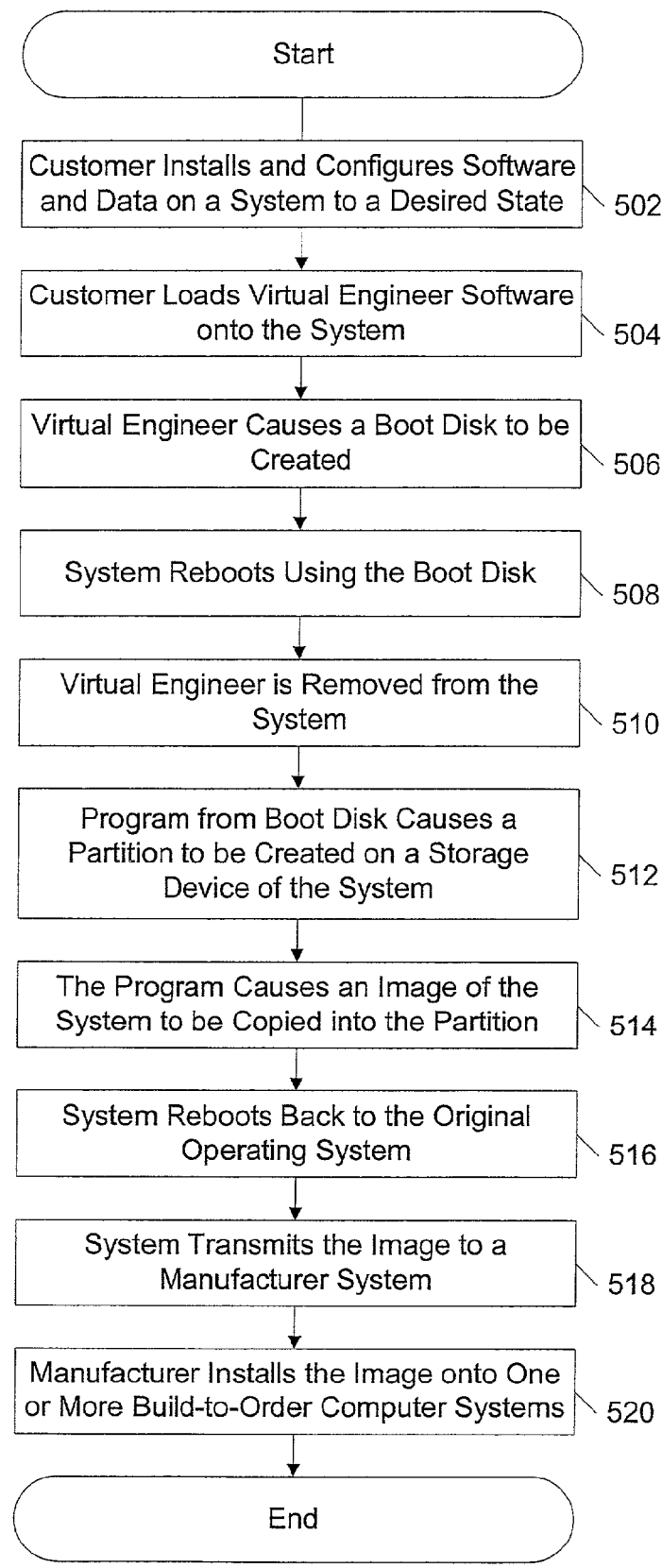
FIG. 5 is a flow chart illustrating an embodiment of a method for receiving a software image for installation into a computer system.

FIG. 5 is a flow chart illustrating an embodiment of a method for receiving a software image for installation into a computer system. A customer installs and configures software and data on a system to a desired state as indicated in step 502. The software may include an operating system, one or more applications, and data. The customer loads virtual engineer software onto the system as indicated in step 504. The virtual engineer software may be downloaded from a computer system of a computer manufacturer in response to providing a request to the computer system.

The virtual engineer causes a boot disk to be created as indicated in step 506. The system reboots using the boot disk as indicated in step 508. The virtual engineer is removed from the system as indicated in step 510. A program from the boot disk causes a partition to be created on a storage device of the system as indicated in step 512. The program causes an image of the system to be copied into the partition as indicated in step 514. The system reboots back to the original operating system as indicated in step 516. The system transmits the image to a manufacturer system as indicated in step 518. The manufacturer installs the image onto one or more computer systems as indicated in step 520.

Figure 6:
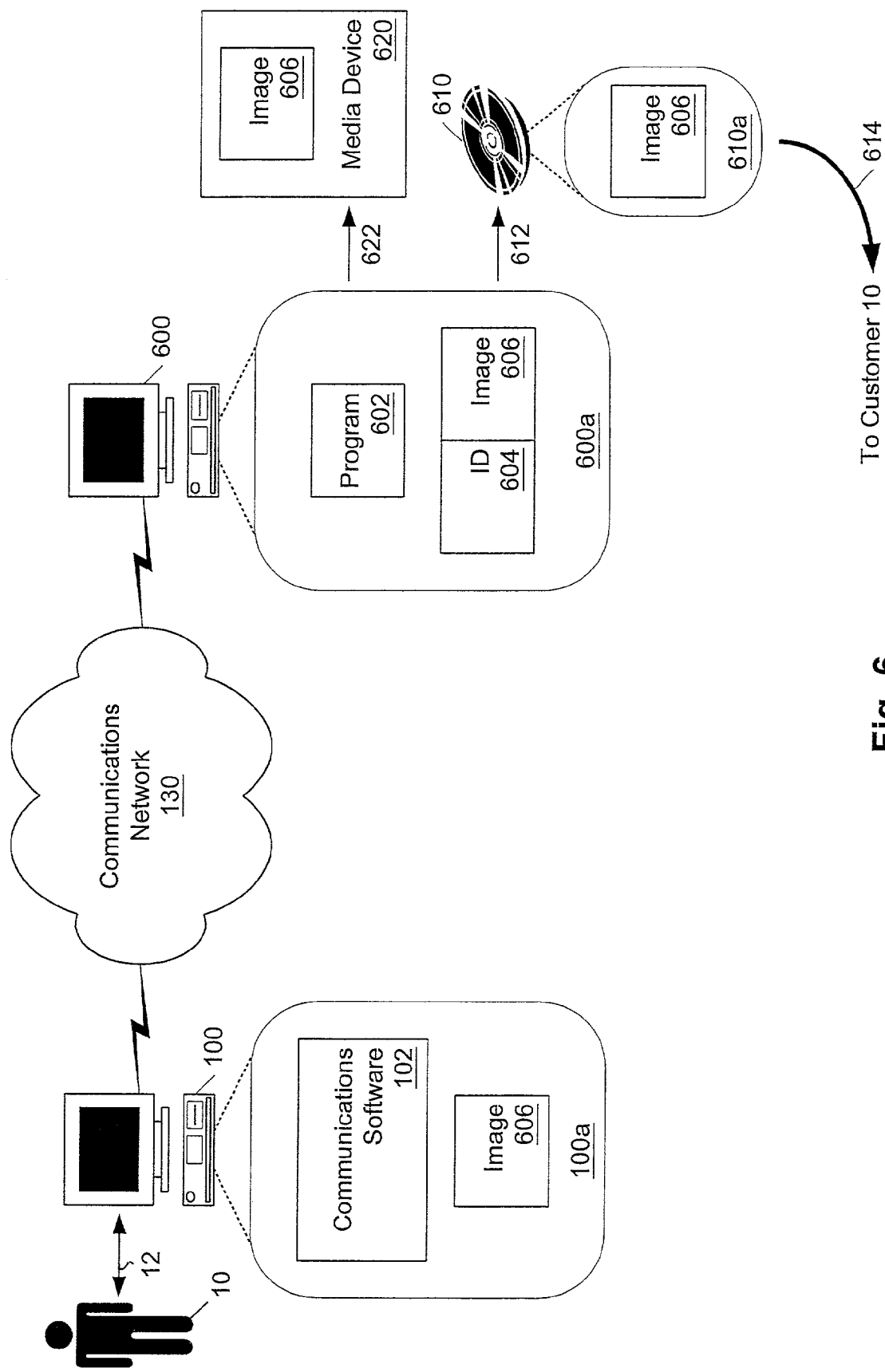
FIG. 6 is diagram illustrating an embodiment of a system for providing a copy of a software image.

FIG. 6 is diagram illustrating an embodiment of a system for providing a copy of a software image. In FIG. 6, computer system 100 is configured to communicate with a server 600 using communications network 130. Network 130 may be any suitable communications medium such as the internet, an intranet, a point-to-point connection, or a wireless connection. Customer 10 operates computer system 100 as indicated by arrow 12.

As shown in box 100*a*, computer system 100 includes communications software 102. Communications software 102 allows customer 10 to communicate with server 600. Computer system 100 may be any type of computer system that includes processing and storage capabilities. Examples of computer systems include desktop, laptop, server, portable, and handheld computer systems.

As shown in a box 600*a*, server 600 includes a program 602. Program 602 allows customer 10 to retrieve a software image 606 from server 600 using computer system 100 and communications software 102.

Image 606 includes a copy of the software and data stored on one or more computer systems owned or used by customer 10. Image 606 may have been the image installed by a manufacturer onto one or more computer systems previously ordered by customer 10 and is stored on server 600 with identifier 604. At some point, one or more of the computer systems may experience either a hardware or software failure. The failure may render the computer system inoperable such that a new copy of image 606 is needed for the failing system.

Program 602 allows customer 10 to identify and retrieve image 606 using a variety of delivery methods. Program 602 allows customer 10 to log in to server 600 using communications software 102. Program 602 may do so using a secure transmission method whereby only authorized individuals are allowed to access image 606. After customer 10 logs in, program 602 provides customer 10 with the ability to select an image for delivery as well as the method for the delivery. The choices of images for customer 10 to select correspond to one or more images previously installed onto one or more of customer 10's computer systems by a manufacturer. These images may have been previously assigned names or other customer-defined terminology to allow customer 10 to rapidly identify the image customer 10 needs for the failing computer system.

In the embodiment shown in FIG. 6, customer 10 selects image 606 for retrieval. After customer 10 makes this selection, program 602 causes customer 10 to select the method for retrieving image 606. As shown in FIG. 6, image 606 may be downloaded from server 600 onto computer system 100 using communications network 130, copied from server 600 or another server to a CD-ROM 610 and provided to customer 10 as indicated by an arrow 612 and an arrow 614, or copied from server 600 or another server onto a media device 620 and provided to customer 10 as indicated by an arrow 622 and arrow 614.

The method selected by customer 10 may depend on the type of failure on the failing computer system. For example, if a media device such as a hard disk drive causes the failure in the computer system, then customer 10 may select to have image 606 copied onto the same or similar type of media device and shipped to customer 10 as indicated by arrows 622 and 614. Alternatively, customer 10 may select to have image 606 downloaded onto computer system 100 to allow customer 10 to store image 606 onto a replacement media device (not shown in FIG. 6). Customer 10 may then install the replacement media device into the failed computer system.

As another example, the failure may be such that it is preferable for customer 10 to recover the failing system using an image stored on CD-ROM. Accordingly, customer 10 may select to have image 606 copied onto CD-ROM 610 by the manufacturer or at another remote location and shipped to customer 10 as indicated by arrows 612 and 614. Alternatively, customer 10 may select to have image 606 downloaded onto computer system 100 and burned onto a CD-ROM (not shown in FIG. 6).

Where customer 10 selects the use of a CD-ROM, one or more of several security measures may be employed to prevent customer 10 from installing image 606 on unauthorized computer systems. First, program 602 may require customer 10 to contractually agree not to install image 606 on unauthorized computer systems in exchange for providing image 606. Next, program 602 may cause a service tag to be burned onto the CD-ROM to allow image 606 to be copied only onto a particular system. Further, a single-use license may be created on image 606 to allow it to only be used once with the sole intention of correcting the system failure. Still further, a table of contents file on the CD-ROM may be deleted. After image 606 is restored onto the failed computer system, the CD-ROM session could be re-opened and then closed thus inhibiting the CD-ROM from further use.

As a further example, customer 10 may experience software corruption on computer system 100 that does not prohibit the use of the computer system 100. In this case, customer 10 may opt to connect to server 600 using communications software 102 and may use program 602 to restore the image on computer system 100.

Figure 7:
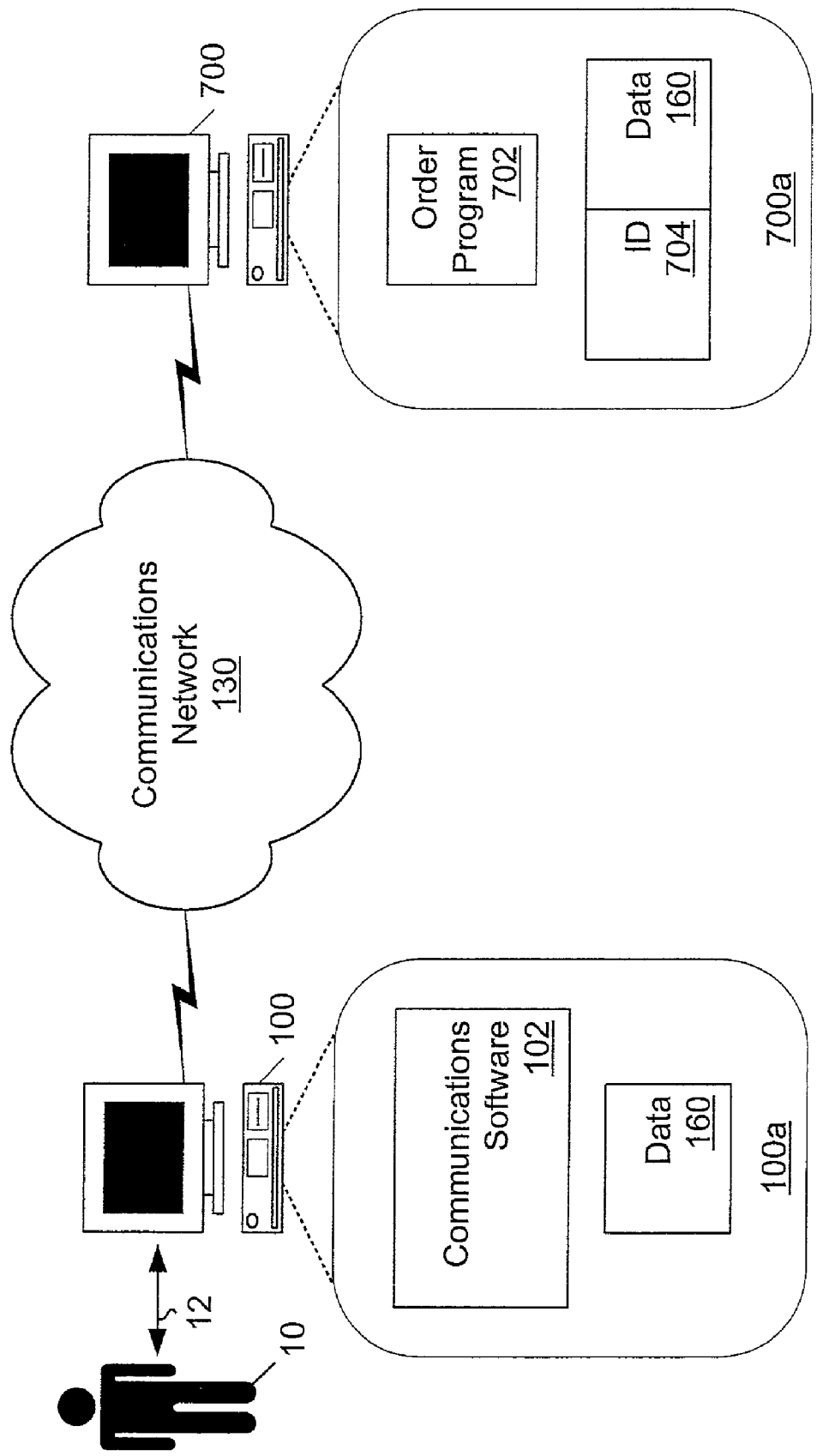
FIG. 7 is a diagram illustrating an embodiment of a system for providing data for installation onto a computer system.

FIG. 7 is a diagram illustrating an embodiment of a system for providing data for installation into a computer system. In FIG. 7, computer system 100 is configured to communicate with a server 700 using communications network 130. Customer 10 operates computer system 100 as indicated by arrow 12.

As shown in box 100a, computer system 100 includes communications software 102 and data 160. Communications software 102 allows customer 10 to communicate with server 700. As shown in a box 700a, server 700 includes an order program 702. Order program 702 allows customer 10 to place an order for a computer system using computer system 100 and communications software 102. The computer system ordered by customer 10 may be a build-to-order computer system where customer 10 specifies one or more hardware or software components to be installed in the computer system. Accordingly, order program 702 may allow customer 10 to specify hardware and software components of one or more build-to-order computer systems. The software and hardware components may be the same or different on the build-to-order computer systems included in an order.

Customer 10 may wish to have data 160 installed on one or more of the computer systems in an order. Data 160 may be any type of files or other data that customer 10 wishes to have installed. In particular, data 160 may include ASCII text, one or more Lotus Notes IDs, one or more Outlook mailboxes, binary files, or other secret or proprietary documents. To allow data 160 to be installed on a computer system or systems of an order, order program 702 allows customer 10 to identify data 160 and causes data 160 to be received by and stored on server 700. As shown in box 700a, order program 702 causes data 160 to be stored onto server 700 along with an identifier 704. Identifier 704 specifies the location of data 160 on server 700 and may be stored as part of an order generated and stored by order program 702.

To store data 160 on server 700, a tool such as PkZip, WinZip, or RPM may be used to package data 160 and include a path structure to ensure that data 160 is properly installed onto one or more computer systems during the manufacturing process. Order program 702 may also prompt customer 10 to enter the desired location for data 160 on the ordered computer systems.

The order placed by customer 10 may be submitted to server 700 using SSL/PCT, IP security, or other secure transmission type. Data 160 may be submitted to server 700 using a secure transmission type such as PPTP. Server 700 may use MMPE (RSA RC4), DES, or any other government-approved encryption method.

During the manufacturing process, the existence of data 160 will be detected from the order from customer 10. Data 160 will be located using identifier 704 and stored onto the one or more computer systems specified by the order. Data 160 may be unpackaged directly from server 700 or another server to the ordered system or systems, copied from server 700 or another server to the ordered system or systems, or moved from server 700 or another server to the ordered system or systems and unpackaged if required.

As can be seen, the principal advantages of these embodiments are that they allow a computer manufacturer to install a software image onto a computer system. A customer may configure software and data to a desired state to create a desired software image. The computer manufacturer obtains the software image from the customer and installs the image onto a computer system ordered by the customer.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of manufacturing a computer system comprising:
   providing a communications network between a customer and a manufacturer;
   configuring a first computer system to communicate with a second computer system;
   including a first program and a second program in the second computer system;
   the customer accessing the first program providing a software image to the manufacturer using the second program;
   the first program providing the customer with an option to upload the software image;
   the first program containing customer information;
   using the option, the customer requesting the manufacturer to upload the software image in an ordered computer system, and in response, the second program is downloaded to cause a boot disk to be created;
   the second program including a boot code and a third program;
   storing the boot code and the third program on the boot disk, the boot code being configured to initiate the third program; and
   removing the second program from the first computer system.

2. The method as defined in claim 1, further comprising: comparing the ordered computer system to a base image to determine differences.

3. The method as defined in claim 2, further comprising: storing the differences between the ordered computer system and the base image in a delta file.

4. The method as defined in claim 3, further comprising: manufacturing the ordered computer system by using the base image and the delta file.

5. The method as defined in claim 1, further comprising: recieving a customer order from a customer computer system via the Internet.

6. The method as defined in claim 5, further comprising: storing a link onto the customer computer system.

7. The method as defined in claim 1, further comprising: storing an address that associates the software image with the customer information.

8. The method as defined in claim 7, further comprising: installing the software image on the first computer system.

\* \* \* \* \*

UNITED STATES PATENT AND TRADEMARK OFFICE
CERTIFICATE OF CORRECTION

PATENT NO. : 7,146,612 B2  
APPLICATION NO. : 09/860804  
DATED : December 5, 2006  
INVENTOR(S) : Derek Sedlack It is certified that error appears in the above-identified patent and that said Letters Patent is hereby corrected as shown below:

Claim 1, Column 12, Line 56, delete "containing" and insert --obtaining--.

Claim 8, Column 12, Line 8, delete "first" and insert --ordered--.

Signed and Sealed this

Twenty-fifth Day of December, 2007

JON W. DUDAS  
*Director of the United States Patent and Trademark Office*